(12) United States Patent
Taima et al.

(10) Patent No.: US 6,336,210 B1
(45) Date of Patent: Jan. 1, 2002

(54) PANEL-PRESENTATION-SOFTWARE CREATION METHOD, COMPUTER-READABLE RECORD MEDIUM RECORDING A PANEL-PRESENTATION-SOFTWARE CREATION PROGRAM, AND PANEL-PRESENTATION-SOFTWARE CREATION DEVICE

(75) Inventors: Kenji Taima, Moriguchi; Teruhiro Yamada, Katano; Tetsuya Enomoto, Yawata; Satoshi Takemoto; Ryuhei Amano, both of Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/258,193

(22) Filed: Feb. 26, 1999

(30) Foreign Application Priority Data

Feb. 27, 1998 (JP) .................................. 10-046099
Feb. 27, 1998 (JP) .................................. 10-046100
Feb. 27, 1998 (JP) .................................. 10-046102
Feb. 27, 1998 (JP) .................................. 10046101

(51) Int. Cl.$^7$ ................................................ G06F 9/45
(52) U.S. Cl. ......................................... 717/1; 717/11
(58) Field of Search ...................... 717/1, 11; 345/334, 345/141, 121, 133

(56) References Cited

FOREIGN PATENT DOCUMENTS

| JP | 2-275308 | 11/1990 |
| JP | 3-273431 | 12/1991 |
| JP | 4-42356 | 2/1992 |
| JP | 5-290095 | 11/1993 |
| JP | 5-314108 | 11/1993 |

OTHER PUBLICATIONS

"Microsoft Office for Windows 95, Guide for Practical Use", First Edition, Nov. 15, 1995, Microsoft Corporation, pp. 247–283 (5th section, "presentation of ideas—prepare for presentation—").

Karin Kylander et al, "Gimp User Manual v0.7", 1997, Chapter 4, File and Save.

Database Inspec on SIN, Institute of Electrical Engineers, (Stevenage, GB), Inspec Abstract No. C9710–6115–019, K. Reichard, E. Foster–Johnson, "The GIMP Toolkit", Abstract, Univ Review (USA), Sep. 1997.

Toshiaki Kamiyama, "Homepage Builder Handbook", First Edition, Kabushiki Kaisha D Art, Oct. 1, 1996, pp. 39–47 and 217–232.

"Microsoft Office for Windows, User's Guide", First Edition, Jul. 15, 1994, Microsoft Corporation, pp. 215–235 (10th chapter, "document template").

*Primary Examiner*—Mark R. Powell
*Assistant Examiner*—Wei Zhen
(74) *Attorney, Agent, or Firm*—Arent Fox Kintner Plotkin & Kahn, PLLC

(57) ABSTRACT

A panel-presentation-software creation method for creating a software which provides presentation of plural edit panels by using a template with an image fitting region and an editor-designated fitting image to be fitted in the image fitting region, the method comprises the steps of creating a reference file containing the description of reference information including link information designating each image file containing the fitting image, and creating a panel presentation software at least including a panel presentation program, a template file containing the template, and the reference file.

15 Claims, 12 Drawing Sheets

FIG. 3

1. PRESENTATION TYPE
2. TEMPLATE FILENAME
3. FRONT-COVER IMAGE FILENAME, IMAGE TYPE, CHARACTER STRING
4. OUTSIDE-VIEW REFERENCE INFORMATION
   1) OUTSIDE-VIEW IMAGE FILENAME, IMAGE TYPE, CHARACTER STRING RELATED TO FIRST BUTTON
   2) OUTSIDE-VIEW IMAGE FILENAME, IMAGE TYPE, CHARACTER STRING RELATED TO SECOND BUTTON
   3) OUTSIDE-VIEW IMAGE FILENAME, IMAGE TYPE, CHARACTER STRING RELATED TO THIRD BUTTON
   4) OUTSIDE-VIEW IMAGE FILENAME, IMAGE TYPE, CHARACTER STRING RELATED TO FOURTH BUTTON
   5) OUTSIDE-VIEW IMAGE FILENAME, IMAGE TYPE, CHARACTER STRING RELATED TO FIFTH BUTTON
5. INSIDE-VIEW REFERENCE INFORMATION
   1) INSIDE-VIEW REFERENCE INFORMATION FOR A-TYPE
      ① INSIDE-VIEW IMAGE FILENAME, IMAGE TYPE, CHARACTER STRING RELATED TO FIRST BUTTON
      ② INSIDE-VIEW IMAGE FILENAME, IMAGE TYPE, CHARACTER STRING RELATED TO FIRST BUTTON
      ③ INSIDE-VIEW IMAGE FILENAME, IMAGE TYPE, CHARACTER STRING RELATED TO FIRST BUTTON
      ④ INSIDE-VIEW IMAGE FILENAME, IMAGE TYPE, CHARACTER STRING RELATED TO FIRST BUTTON
      ⑤ INSIDE-VIEW IMAGE FILENAME, IMAGE TYPE, CHARACTER STRING RELATED TO FIRST BUTTON
   2) INSIDE-VIEW REFERENCE INFORMATION FOR B-TYPE
      ⋮
   9) INSIDE-VIEW REFERENCE INFORMATION FOR I-TYPE
      ⋮

PANEL-PRESENTATION-SOFTWARE CREATION METHOD, COMPUTER-READABLE RECORD MEDIUM RECORDING A PANEL-PRESENTATION-SOFTWARE CREATION PROGRAM, AND PANEL-PRESENTATION-SOFTWARE CREATION DEVICE

BACKGROUND OF THE INVENTION

1. Field of the Invention

The present invention relates generally to a panel-presentation-software creation method, computer-readable record medium recording a panel-presentation-software creation program, and panel-presentation-software creation device.

2. Prior Art

A variety of presentations typically utilize a plurality of drawings. Such an occasion involves a cumbersome manual operation for changing the drawings in the course of the presentation.

It is contemplated that instead of using the drawings, a plurality of images are prepared so as to make the presentation by applying them to a personal computer (hereinafter, referred to as a "PC"). The utilization of the PC offers great merits that the PC streamlines the changing of the images and is capable of storing a software for making plural kinds of presentations.

SUMMARY OF THE INVENTION

The invention has an object to provide a panel-presentation-software creation method, a computer-readable record medium recording a panel-presentation-software creation program, and a panel-presentation-software creation device which streamline the editing of a software involving the panel presentation such as a presentation execution software.

The invention has an object to provide a panel creation method, computer-readable record medium recording a panel creation program and panel creation device which streamline the editing of a software involving the panel presentation such as a presentation execution software.

The invention has an object to provide a panel editing method, computer-readable record medium recording a panel editing program and panel editing device which streamline the editing of a software involving the panel presentation such as a presentation execution software.

The invention has an object to provide a panel presentation method, computer-readable record medium recording a panel presentation program and panel presentation device which permit the output of a voice message corresponding to a character string entered by an editor during the editing of a panel, which is presented via a software involving the panel presentation, such as a presentation execution software.

In accordance with the invention, a first panel-presentation-software creation method for creating a software which provides presentation of plural edit panels by using a template with an image fitting region and an editor-designated fitting image to be fitted in the image fitting region, the method comprises the steps of creating a reference file which contains the description of reference information including link information designating each image file containing the editor-designated fitting image, and creating a panel presentation software at least including a panel presentation program, a template file containing the template, and the reference file.

When the fitted image is changed during the re-editing of the created panel presentation software, the reference information related to the changed fitted image is updated.

Preferably, the panel presentation software includes the image file designated by the link information described in the reference file.

Preferably, an arrangement is made such that the editor may click on the image fitting region in the template image thereby invoking a dialog for permitting the editor to select an image to be fitted in the image fitting region, and the image designated by the editor following the dialog is caused to appear in the image fitting region.

Preferably, an arrangement is made such that when the editor-designated image is shown in the image fitting region in the template image, the editor may click on the image fitting region thereby invoking the dialog for permitting the editor to select an image to be fitted in the image fitting region, and the currently displayed image is replaced by the image re-designated by the editor following the dialog.

A computer-readable record medium recording a panel-presentation-software creation program for creating a software which provides presentation of plural edit panels by using a template with an image fitting region and an editor-designated fitting image to be fitted in the image fitting region, the computer-readable record medium is characterized by recording the panel-presentation-software creation program which serves to implement a facility to create a reference file containing the description of reference information including link information designating each image file containing the editor-designated fitting image, and a facility to create a panel presentation software at least including a panel presentation program, a template file containing the template, and the reference file.

Preferably, the panel presentation software includes the image file designated by the linkin formation described in the reference file.

Preferably, the panel-presentation-software creation program includes a program for implementing a facility to permit the editor clicking on the image fitting region in the template image to invoke a dialog for permitting the editor to select an image to be fitted in the image fitting region, and a facility to cause the image designated by the editor following the dialog to appear in the image fitting region.

A panel-presentation-software creation device for creating a software which provides presentation of plural edit panels by using a template with an image fitting region and an editor-designated fitting image to be fitted in the image fitting region, the panel-presentation-software creation device comprises: means for creating a reference file containing the description of reference information including link information designating each image file containing the editor-designated fitting image; and means for creating a panel presentation software at least including a panel presentation program, a template file containing the template, and the reference file.

Preferably, the panel presentation software includes the image file designated by the link information described in the reference file.

Preferably, the panel-presentation-software creation device further comprises means for permitting the editor clicking on the image fitting region in the template image to invoke a dialog for permitting the editor to select an image to be displayed in the image fitting region, and means for causing the image designated by the editor following this dialog to appear in the image fitting region.

In accordance with the invention, a second panel-presentation-software creation method for creating a software which provides presentation of plural edit panels by using a template with an image fitting region and a character display region, an editor-designated fitting image to be fitted in the image fitting region, and an editor-entered character string to be shown in the character display region, the panel-presentation-software creation method comprises the steps of creating a reference file containing the description of reference information including link information designating each image file containing the editor-designated fitting image, and the editor-entered character string, and creating a panel presentation software at least including a panel presentation program, a template file containing the template and the reference file.

When the fitted image is changed during the re-editing of the created panel presentation software, the reference information related to the changed fitted image is updated whereas when the character string is changed, the reference information related to the changed character string is updated.

Preferably, the panel presentation software includes the image file designated by the link information described in the reference file.

A panel-presentation-software creation program for creating a software which provides presentation of plural edit panels by using a template with an image fitting region and an editor-designated image to be fitted in the image fitting region, the panel-presentation-software creation program serves to implement a facility to create a reference file containing the description of link information designating each image file containing the editor-designated fitting image and a facility to create a panel presentation software including a panel presentation program, the reference file, a template file containing the template, the image file designated by the link information described in the reference file.

In accordance with the invention, a first panel creation method for creating a given panel through the steps of permitting a user to select a given template file from a plurality of template files each containing a template with an image fitting region, and causing a template of the selected template file to appear while fitting a user-designated image in the image fitting region of the displayed template, the panel creation method is characterized in that attribute information regarding a position and a size of the image fitting region is assigned to each template file, and when the user designates an image to be fitted in the image fitting region subsequent to the display of the template of the user-selected template file, the aforesaid attribute information contained in the user-selected template file is referred to for causing the user-designated image to appear at place corresponding to the image fitting region of the template and in a size defined by the image fitting region of the template.

When the template file is changed after the image is fitted in, a template of a post-change template file is displayed instead of the template of the pre-change template file whereas the aforesaid attribute information contained in the post-change template file is referred to for causing the pre-change image to appear at place corresponding to an image fitting region of the post-change template and in a size defined by the image fitting region.

Both a still picture and a motion picture are designatable as the image to be fitted in the image fitting region, and if the selected motion picture is of a stream motion image, the stream motion image is reproducibly displayed in the image fitting region whereas if the selected motion picture is of an interactive motion image adapted for an interactive operation, the interactive motion image is displayed in the image fitting region in an interactively operable manner.

Preferably, an arrangement is made such that the user may click on the image fitting region of the displayed template thereby invoking a dialog for permitting the user to select an image to be fitted in the image fitting region.

In accordance with the invention, a first computer-readable record medium recording a panel creation program for creating a given panel through the steps of permitting a user to select a given template file from a plurality of template files each having a template with an image fitting region, and causing a template of the selected template file to appear while fitting a user-designated image in the image fitting region of the displayed template, the computer-readable record medium is characterized by holding, for each template-file, attribute information regarding a position and a size of the image fitting region, and by recording the panel creation program for implementing a facility which, when the user designates an image to be fitted in the image fitting region subsequent to the display of the template of the user-selected template file, serves to cause the user-designated image to appear at place corresponding to the image fitting region of the template and in a size defined by the image fitting region by referring to the aforesaid attribute information contained in the user-selected template file.

Preferably, the record medium stores a program for implementing a facility to permit the user to click on the image fitting region of the displayed template for invoking a dialog for permitting the user to select an image to be fitted in the image fitting region.

In accordance with the invention, a first panel creation device comprises: a storage unit for storing plural types of template files each containing a template with an image fitting region and attribute information regarding a position and a size of the image fitting region; first means for permitting a user to select a given template file from the plural types of template files; second means for causing a display unit to display a template of the template file selected by the user; and third means which refers to the aforesaid attribute information contained in the template file selected by the user, for causing a user-designated image to appear at place corresponding to the image fitting region of the template displayed by the second means and in a size defined by the image fitting region.

Preferably, the panel creation device further comprises means for permitting the user to click on the image fitting region of the displayed template for invoking a dialog for permitting the user to select an image to be displayed in the image fitting region.

In accordance with the invention, a second panel creation method for creating a given panel through the steps of permitting a user to select a given template file from a plurality of template files each containing a template with a character display region, and causing a template of the selected template file to appear while causing a user-entered character string to appear in the character display region of the displayed template, the panel creation method is characterized in that attribute information regarding a position of the character display region, a character size and a character style is assigned to each template file, and when the user enters a character string subsequent to the display of the template of the user-selected template file, the aforesaid attribute information contained in the user-selected template file is referred to for causing the user-entered character string to appear in the character display region of the template and in the character size and the character style of the aforesaid attribute information.

When the template file is changed subsequent to the character entry, a template of a replacing template file is displayed in stead of the pre-change template whereas the aforesaid attribute information contained in the replacing template file is referred to for causing the pre-change character string to be shown in a character display region of the replacing template and in a character size and a character style defined by the replacing template.

In accordance with the invention, a second computer-readable record medium recording a panel creation program for creating a given panel through the steps of permitting a user to select a given template file from a plurality of template files each containing a template with a character display region, and causing a template of the selected template file to appear while causing a user-entered character string to appear in the character display region of the displayed template, the computer-readable record medium is characterized by holding, for each template file, attribute information regarding a position of the character display region, a character size and a character style, and by recording the panel creation program for implementing a facility which, when the user enters a character string subsequent to the display of a template of the user-selected template file, serves to cause the user-entered character string to appear in the character display region of the template and in a character size and a character style of the aforesaid attribute information by referring to the aforesaid attribute information contained in the user-selected template file.

In accordance with the invention, a second panel creation device comprises: a storage unit for storing plural types of template files each containing a template with a character display region and attribute information regarding a position of the character display region, a character size and a character style; first means for permitting a user to select a given template file from the plural types of template files; second means for causing a display unit to display a template of the user-selected template file; and third means which refers to the aforesaid attribute information contained in the user-selected template file for causing a user-entered character string to appear at a character display position of the template displayed by the second means and in a character size and a character style of the aforesaid attribute information.

In accordance with the invention, a panel presentation method for providing presentation of plural edit panels by using a template with a character display region for showing an editor-entered character string, and the editor-entered character string to be displayed in the character display region, the panel presentation method is characterized in that, in the edit panel presentation, a phrase predetermined for the presented panel is combined with the character string shown in the character display region of the presented panel for forming a sentence and the resultant sentence is outputted as speech.

In accordance with the invention, a computer-readable record medium recording a panel presentation program for providing presentation of a plurality of edit panels by using a template with a character display region for showing an editor-entered character string and the editor-entered character string to be displayed in the character display region, the computer-readable record medium is characterized by recording the panel presentation program for implementing a facility to form a sentence, in the edit panel presentation, by combining a phrase predetermined for the presented panel with the character string shown in the character display region of the presented panel and a facility to output the resultant sentence as speech.

In accordance with the invention, a panel presentation device for providing presentation of plural edit panels by using a template with a character display region for showing an editor-entered character string and the editor-entered character string to be displayed in the character display region, the panel presentation device comprises means for forming a sentence, in the edit panel presentation, by combining a phrase predetermined for the presented panel with the character string shown in the character display region of the presented panel, and means for outputting the resultant sentence as speech.

BRIEF DESCRIPTION OF THE DRAWINGS

FIG. 3 is a schematic diagram showing reference information items constituting a reference file;

DETAILED DESCRIPTION OF PREFERRED EMBODIMENT

Now referring to the accompanying drawings, description will be made on a preferred embodiment of the invention applied to a presentation creation software for creating a presentation execution software for use in the execution of a presentation of buildings such as houses, condominiums and the like.

[1] System Configuration

Figure 1:
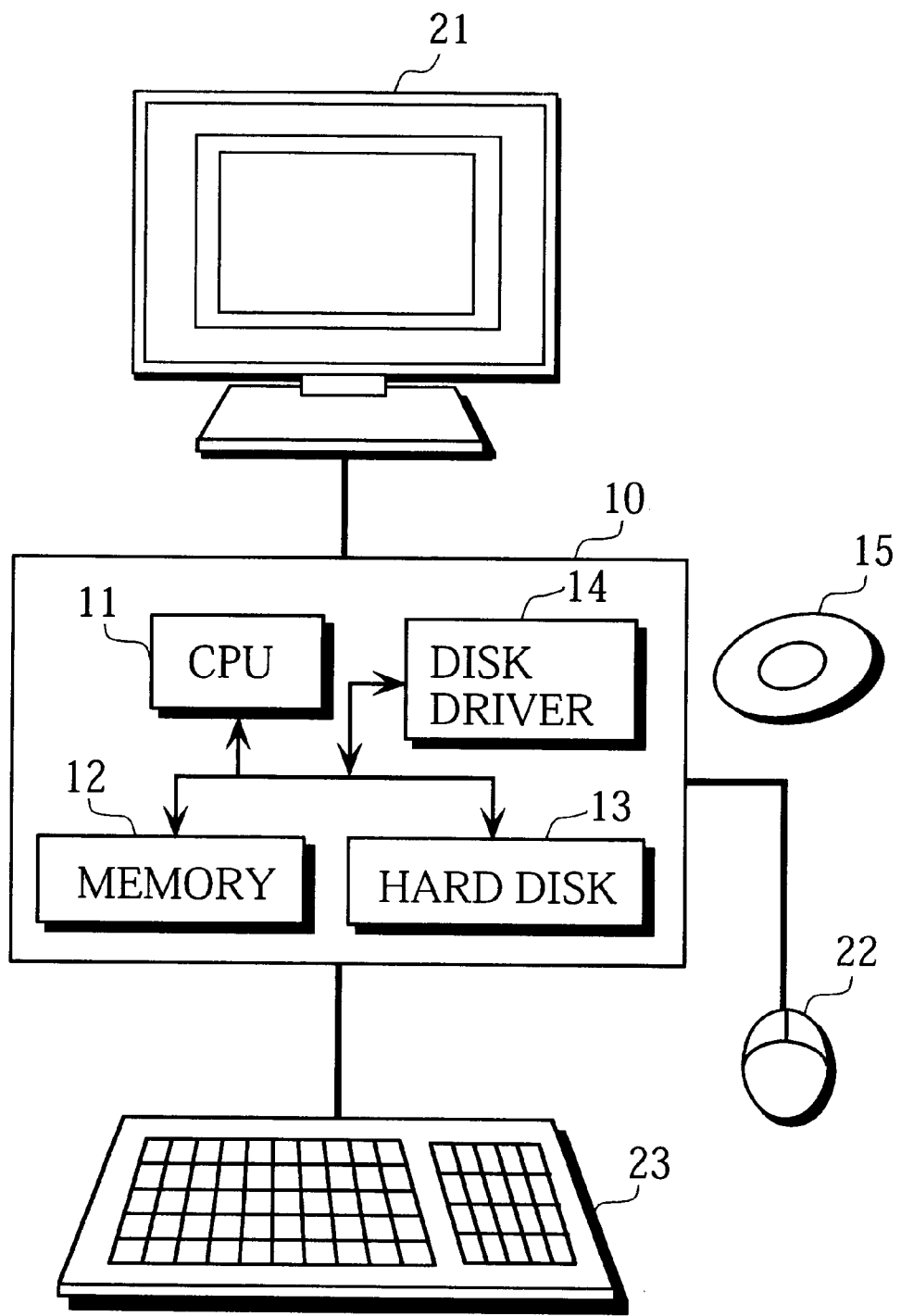
FIG. 1 is a block diagram showing a system configuration.

FIG. 1 diagrammatically illustrates a system configuration.

A display 21, a mouse 22 and a keyboard 23 are connected to a personal computer 10. The personal computer 10 includes a CPU 11, a memory 12, a hard disk 13 and a disk driver 14 for driving a removable disk 15 such as a CD-ROM.

Additionally to the OS (operating system) and the like, the hard disk 13 (or the removable disk 15) stores a presentation creation software for creating a presentation execution software for use in the execution of a presentation of the buildings such as houses and condominiums. The presentation creation software includes a presentation creation program, a plurality of template files, a presentation execution program and the like.

Plural types of prestored presentation images, previously prepared by an editor producing the presentation, are contained in the hard disk 13 (or the removable disk 15). A presentation execution software (presentation folder) created by the presentation creation software is committed to storage at the hard disk 13 (or the removable disk 15).

[2] Procedure for Creating a New Presentation Execution Software

Figure 2:
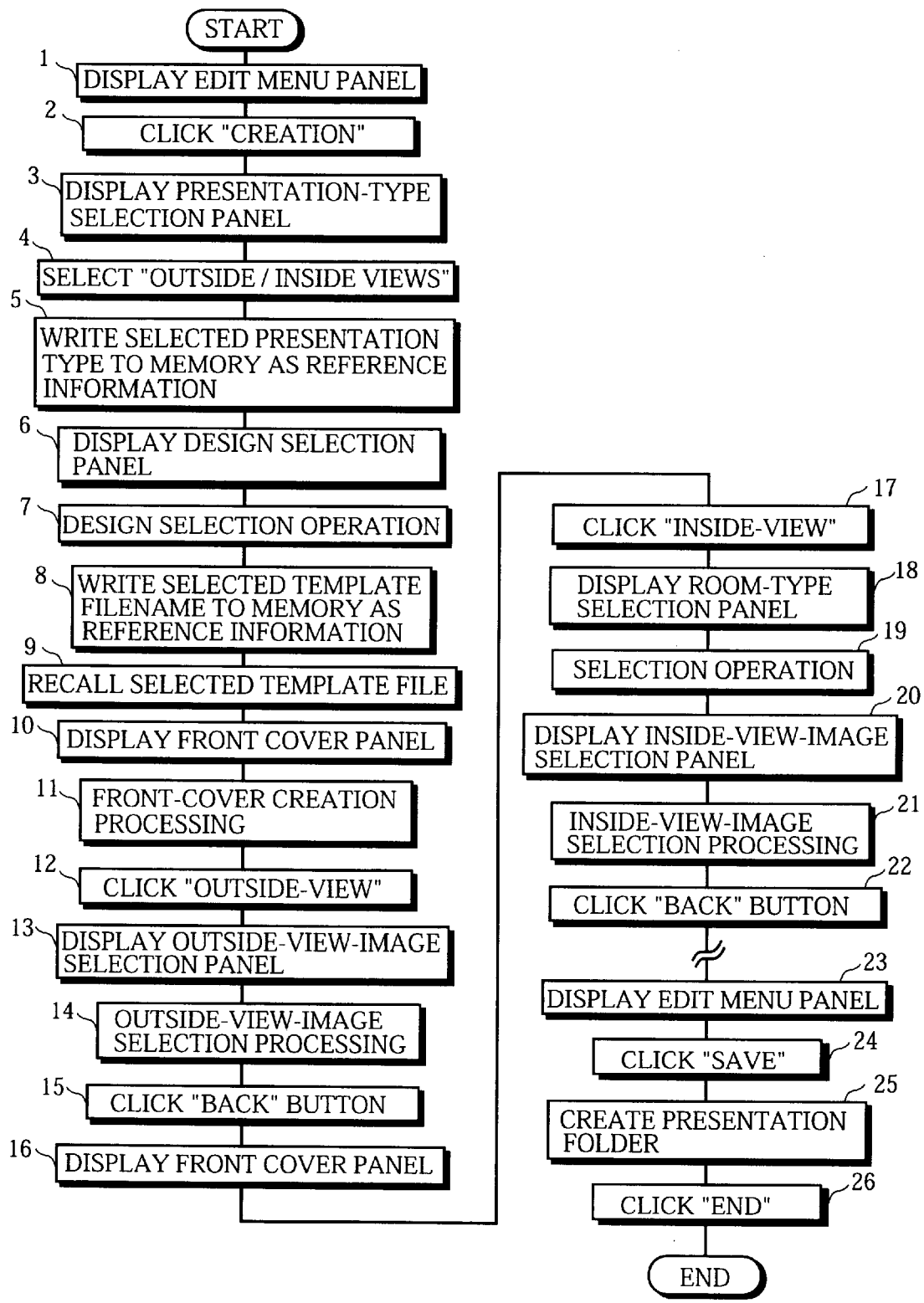
FIG. 2 is a flowchart representing steps in a procedure for creating a new presentation execution software.

FIG. 2 represents steps in the procedure for creating a new presentation execution software.

Figure 4:
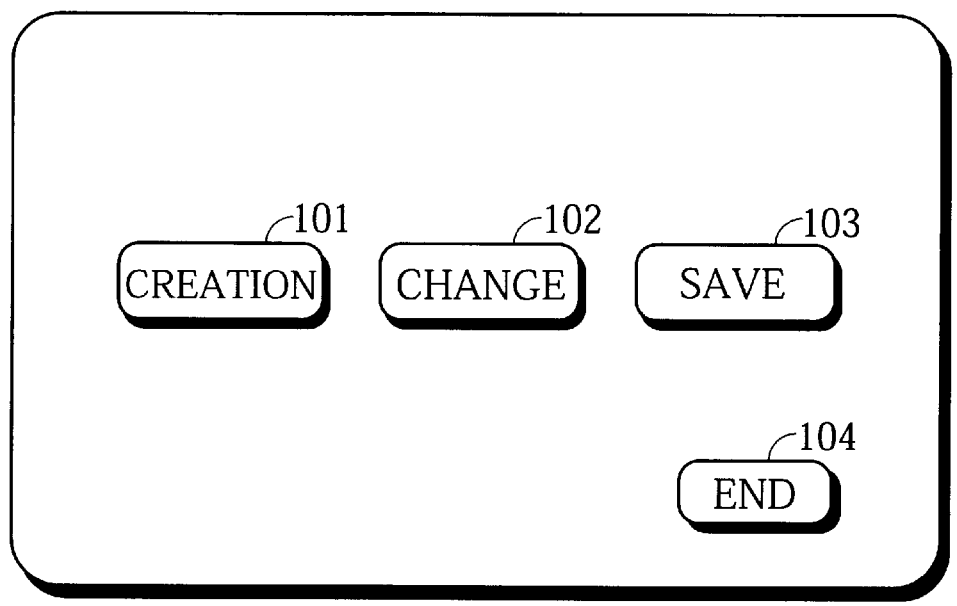
FIG. 4 is a schematic diagram showing an exemplary edit menu panel.

When the presentation creation program of the presentation creation software is started, an edit menu panel is displayed, as shown in FIG. 4 (Step 1). The edit menu panel includes CREATION button 101, CHANGE button 102, SAVE button 103 and END button 104.

CREATION button 101 is clicked in order to create a new presentation execution software. CHANGE button 102 is clicked in order to change a content of an already created presentation execution software. SAVE button 103 is clicked in order to store the created presentation execution software in the hard disk 13. END button 104 is clicked in order to terminate the presentation creation program.

Figure 5:
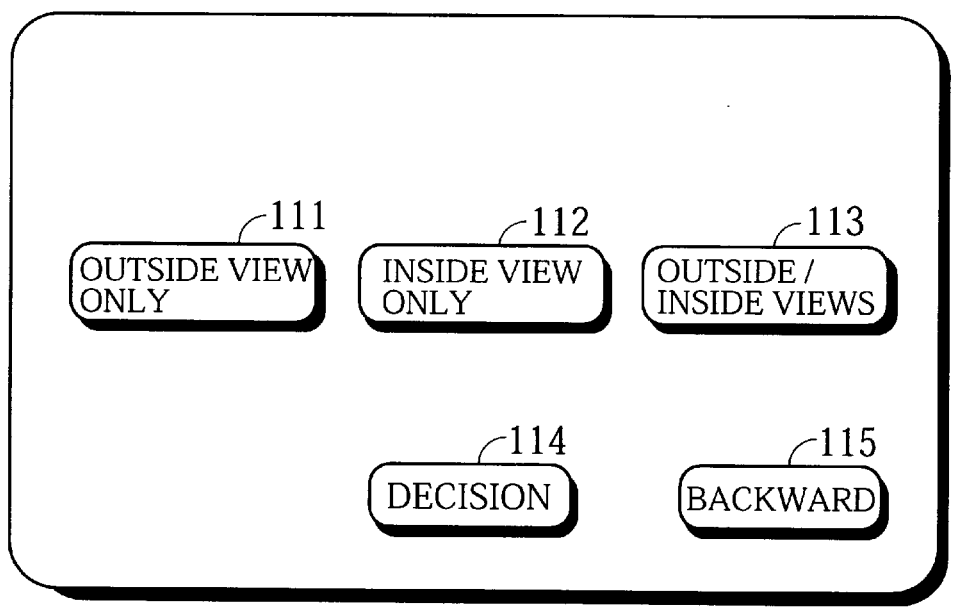
FIG. 5 is a schematic diagram showing an exemplary presentation-type selection panel.

When the editor clicks on CREATION button 101 (Step 2), a presentation-type selection panel is displayed, as shown in FIG. 5 (Step 3). The presentation-type selection panel includes a type-selection button for "outside view only" 111, a type-selection button for "inside view only" 112, a type-selection button for "outside/inside views" 113, DECISION button 114 and BACKWARD button 115.

The type-selection button for "outside view only" 111 is clicked when a presentation including only the outside views of buildings is created. The type-selection button for "inside view only" 112 is clicked when a presentation including only the inside views of buildings is created. The type-selection button for "outside/inside views" 113 is clicked when a presentation including both the outside and inside views of buildings is created.

DECISION button 114 is used for confirming a presentation type selected from the aforesaid three types of presentations. BACKWARD button 115 is used for returning a screen display to a previous one (the edit menu panel shown in FIG. 4).

Figure 6:
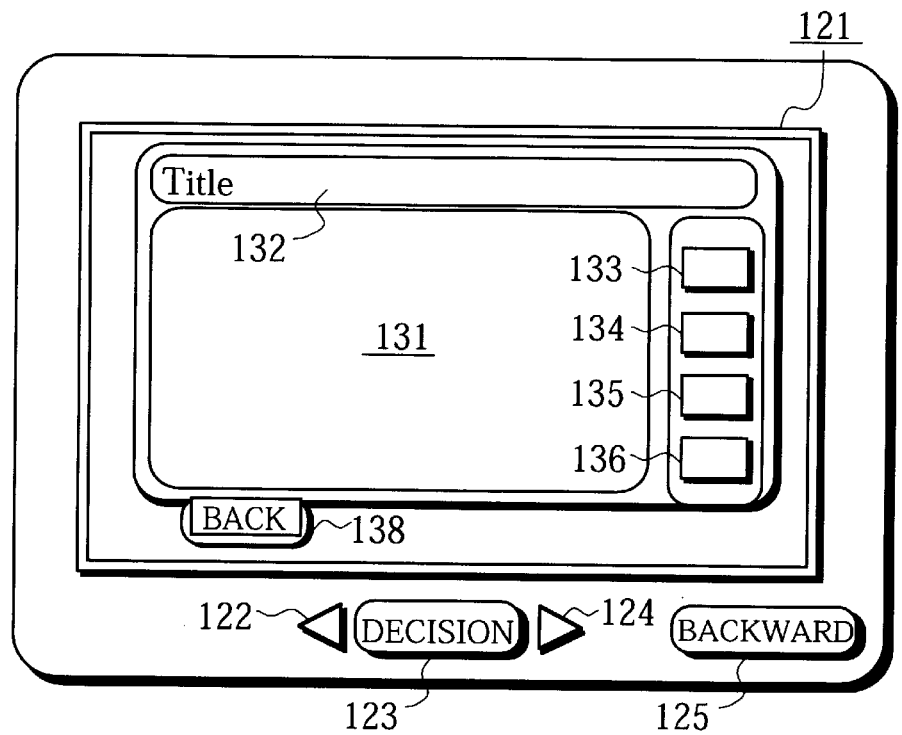
FIG. 6 is a schematic diagram showing an exemplary design selection panel.

It is assumed here that the type-selection button 113 for "outside/inside views" is selected. When DECISION button 114 is clicked with the type-selection button 113 for "outside/inside views" selected (Step 4) the selected presentation type is written to a file creation area of the memory 12 or the hard disk 13, as reference information as shown in FIG. 3 (Step 5) while a design selection panel is displayed as shown in FIG. 6 (Step 6).

The design selection panel includes a template image 121 contained in one of the plural template files previously prepared by the presentation creation software, DECISION button 123, a first design switch button 122 and a second design switch button 124, which sandwich DECISION button 123 therebetween, and BACKWARD button 125.

Where no template file is selected, there appears a template image contained in a default template file included in the plural types of previously prepared template files.

Each template file includes a template image and attribute information. The template image includes an image for use in a front cover panel, an image for use in an outside-view-image selection panel, an image for use in a room-type selection panel, and an image for use in an inside-view-image selection panel, which will be described hereinlater. The images for use in the outside-view-image selection panel and the inside-view-image selection panel are shared.

Although being different in design, the respective template images displayed in the design selection panel (or images for use in the outside-view-image selection panel) commonly include an image fitting region 131, a title (subtitle) entry region 132, SELECTION buttons 133 to 136 and BACK button 138, as shown in FIG. 6, provided that the number of selection buttons is not necessarily common to all the template images.

Figure 7:
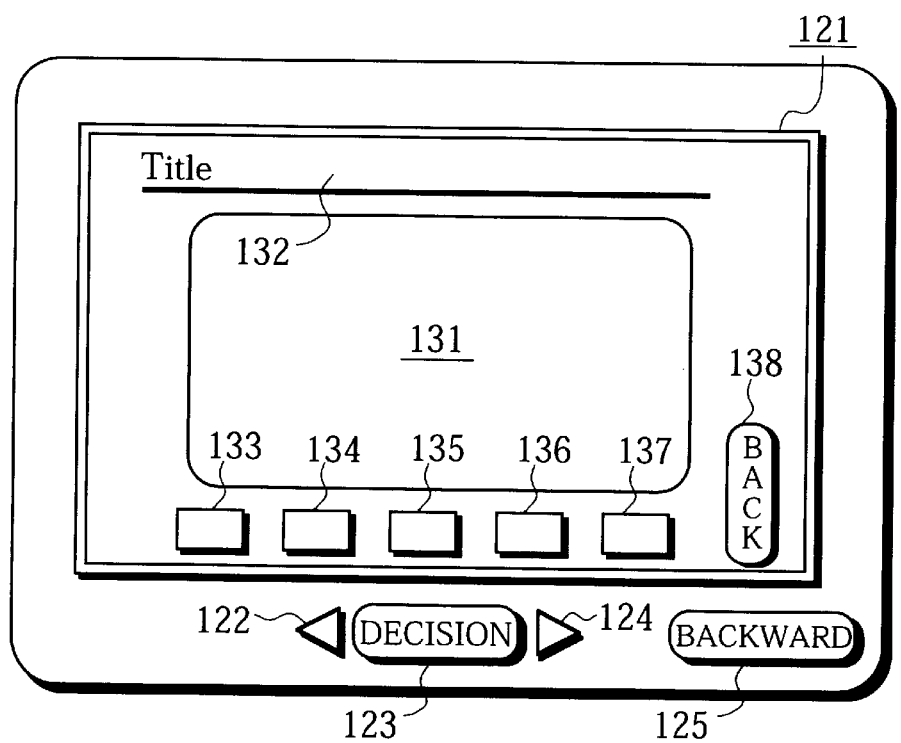
FIG. 7 is a schematic diagram showing the design selection panel presenting a different template image from that of FIG. 6.

FIG. 7 illustrates an exemplary template image alternative to that shown in FIG. 6. Principal differences between the template image of FIG. 6 and that of FIG. 7 consist in that the former template image includes four selection buttons 133 to 136 whereas the latter template image includes five selection buttons 133 to 137, that the selection buttons 133 to 136 are disposed at a right-hand portion of the former template image whereas the selection buttons 133 to 137 are disposed at a lower portion of the latter template image, and that a center of the image fitting region 131 is displaced leftward with respect to the lateral length of the former template image whereas the center of the image fitting region is positioned centrally of the lateral length of the latter template image.

The attribute information contained in each template file includes the following information items for each of the template images contained therein: information regarding a position and a size of the image fitting region, information regarding a display position, a character size and a character style of a character string such as the title (subtitle) , and information regarding a position and size of each button as well as a jump address for each button.

The selection of the template file is accomplished by invoking a template image of a desired design via the design switch buttons 122, 124, followed by clicking on DECISION button 123. It is assumed here that the template file of the design shown in FIG. 7 is selected. BACKWARD button 125 is used for returning the screen display to a previous one (the presentation-type selection panel shown in FIG. 5).

When the design (template file) is selected (Step 7), a name of the selected template file, as the reference information, is written to the reference file creation area of the memory 12 as shown in FIG. 3 (Step 8) while the selected template file is recalled (Step 9).

Figure 8:
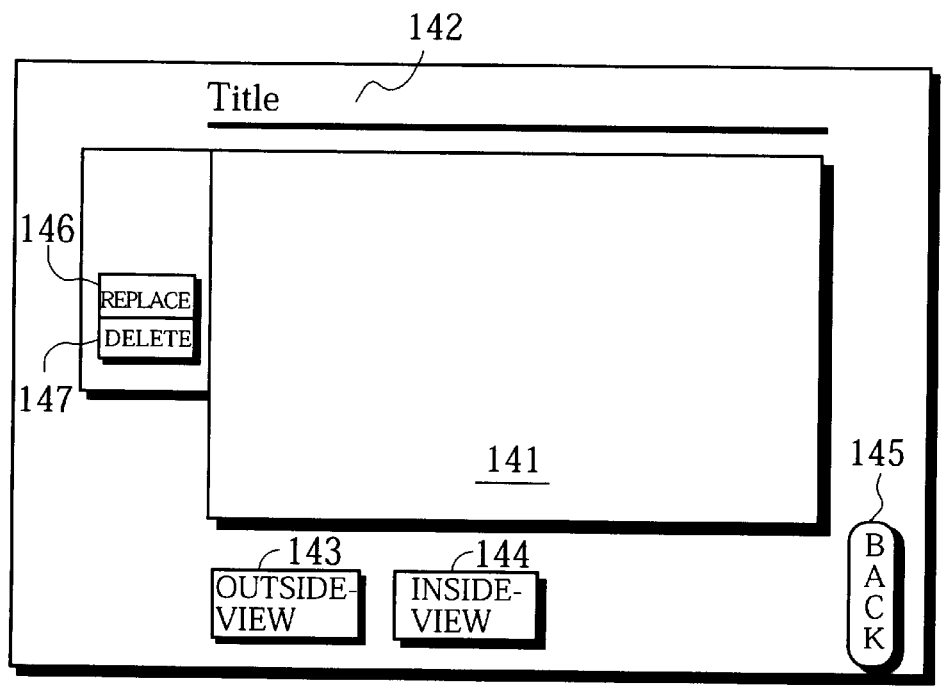
FIG. 8 is a schematic diagram showing an exemplary front cover panel.

Then, as shown in FIG. 8, a front cover panel corresponding to the selected design (the panel including a front cover image contained in the selected template file) is displayed (Step 10).

The front cover panel includes an image fitting region 141 in which a front cover image previously prepared by the editor is fitted, a title entry region 142, OUTSIDE-VIEW button 143, INSIDE-VIEW button 144, BACK button 145, IMAGE REPLACE button 146 and IMAGE DELETE button 147.

A front cover creation processing is performed by using the front cover image (Step 11). First, the editor moves a cursor to the image fitting region 141 by means of the mouse 22 and clicks on the image fitting region 141, thereby invoking a dialog (not shown) for permitting the editor to select any one of image files previously prepared by the editor. The editor follows the dialog so as to select an image file containing a front cover image to be used. Incidentally, it is designed such that when the editor moves the cursor to the image fitting region 141, the representation of the cursor is changed (e.g., a hand-shaped graphical representation) in order to explicitly point out modifiable places to the editor.

When the image file is selected by the editor, the image type is determined. On the other hand, the selected image file is recalled and based on the information regarding the position and size of the image fitting region 141 contained in the template file recalled in Step 9, the recalled image is modified in size so as to match the image fitting region 141. Subsequently, the image thus modified is fitted in the image fitting region 141. Then, as shown in FIG. 3, the filename and image type of the image recalled as the front cover image are written to the reference file creation area of the memory 12, as the reference information (indicative of the filename and image type of the front cover image).

When the editor moves the cursor to the title entry region 142 via the mouse 22 and then enters a title through the keyboard 23, the entered character string is displayed at a predetermined position and in a predetermined character size and character type based on the information regarding the character display position of the title entry region 142, the character size and the character style, the information contained in the template file recalled in Step 9. On the other hand, as shown in FIG. 3, the entered character string is written to the reference file creation area of the memory 12 as the reference information (the front-cover character string). Incidentally, it is designed such that when the editor moves the cursor to the title entry region 142, the representation of the cursor is changed to a figure of a vertical bar thereby prompting for character entry.

BACK button 145 is used for returning the screen display to a previous one (the design selection panel shown in FIG. 7). IMAGE REPLACE button 146 is used for replacing the once selected front cover image with another. The replacement of the front cover image is also effected by clicking on the image fitting region 141. IMAGE DELETE button 147 is used for deleting the selected front cover image. The deletion of the front cover image is also effected by right-clicking on the image fitting region 141.

When OUTSIDE-VIEW button 143 is clicked after completion of the front cover creation processing (Step 12), the outside-view-image selection panel corresponding to the design selected by the editor in Step 7 (the outside-view-image selection panel contained in the template file selected by the editor in Step 7) is displayed (Step 13).

The outside-view-image selection panel includes an image fitting region 151 in which an outside-view image previously prepared by the editor is fitted, a subtitle entry region 152, first to fifth OUTSIDE-VIEW SELECTION buttons 153 to 157, BACK button 158, IMAGE REPLACE button 159 and IMAGE DELETE button 160.

An outside-view-image selection processing is performed by using the outside-view-image selection panel (Step 14). In the outside-view-image selection processing, the editor is permitted to select five types of outside-view images, as the presentation images, in correspondence to the first to fifth OUTSIDE-VIEW SELECTION buttons 153 to 157. Firstly, when the editor selects any one of the OUTSIDE-VIEW SELECTION buttons 153 to 157, the selected button is lit up. Subsequently, the editor clicks on the image fitting region 151, thereby invoking a dialog (not shown) for permitting the editor to select any one of the image files previously prepared by the editor. Following the dialog, the editor accomplishes the selection of the image file presenting the outside-view image in correspondence to the button selected from the buttons 153 to 157.

After the image file is selected by the editor, the image type is determined. On the other hand, the selected image file is recalled and based on the information regarding the position and size of the image fitting region 151 contained in the template file recalled in Step 9, the image thus recalled is modified in size so as to match the image fitting region 151. Thereafter, the image thus modified is fitted in the image fitting region 151.

Then as shown in FIG. 3, the filename and image type of the image recalled as the outside-view image are written to the reference file creation area of the memory 12, as the outside-view reference information (the filename and image type of the outside-view image) associated with the selected OUTSIDE-VIEW SELECTION button.

In a case where the image type of the image file selected by the editor is the motion picture, a motion-image reproduction operation section 190 is displayed to permit the selected motion picture to be reproduced in the image fitting region 151. The motion-image reproduction operation section 190 includes REVERSE REPRODUCTION button 191, STOP button 192 and FORWARD REPRODUCTION button 193. The reproduction of the motion picture is effected by clicking on REPRODUCTION button 191 or 193. In a case where the image type of the image file selected by the editor is an interactive motion picture (e.g., Quick Time VR), the image is displayed in the image fitting region 151 in an interactively operable manner.

When the editor moves the cursor to the subtitle entry region 152 via the mouse 22 and then enters a title through the keyboard 23, the entered character string is displayed at a given position and in a given character size and style based on the position of the title entry region 152 and the character size and style which are contained in the template file recalled in Step 9. On the other hand, as shown in FIG. 3, the entered character string is written to the reference file creation area of the memory 12 as the outside-view reference information (outside-view character string) associated with the selected OUTSIDE-VIEW SELECTION button.

BACK button 158 is used for returning the screen display to a previous one (the front cover panel shown in FIG. 8). IMAGE REPLACE button 159 is used for replacing the once selected outside-view image with another. IMAGE DELETE button 160 is used for deleting the once selected outside-view image.

When the outside-view-image selection processing is complete with one or more outside-view images selected in association with one or more of the first to fifth OUTSIDE-VIEW SELECTION buttons 153 to 157, the screen display is returned to the front cover panel of FIG. 8 by clicking on BACK button 158 (Steps 15, 16). Then, with a click on INSIDE-VIEW button 144 (Step 17), a room-type selection panel corresponding to the design selected by the editor in Step 7 is displayed (Step 18).

The room-type selection panel includes first to ninth ROOM-TYPE SELECTION buttons 161 to 169, type-name entry regions 171 to 179 disposed under the respective buttons 161 to 169, a title entry region 170 and BACK button 180. The room-type selection buttons are used for selecting any one of various room types in a case where an apartment, such as condominiums, has rooms the interior of which varies depending upon the room types. BACK button 180 is used for returning the screen display to the previous one (the front cover panel shown in FIG. 8)

Figure 9:
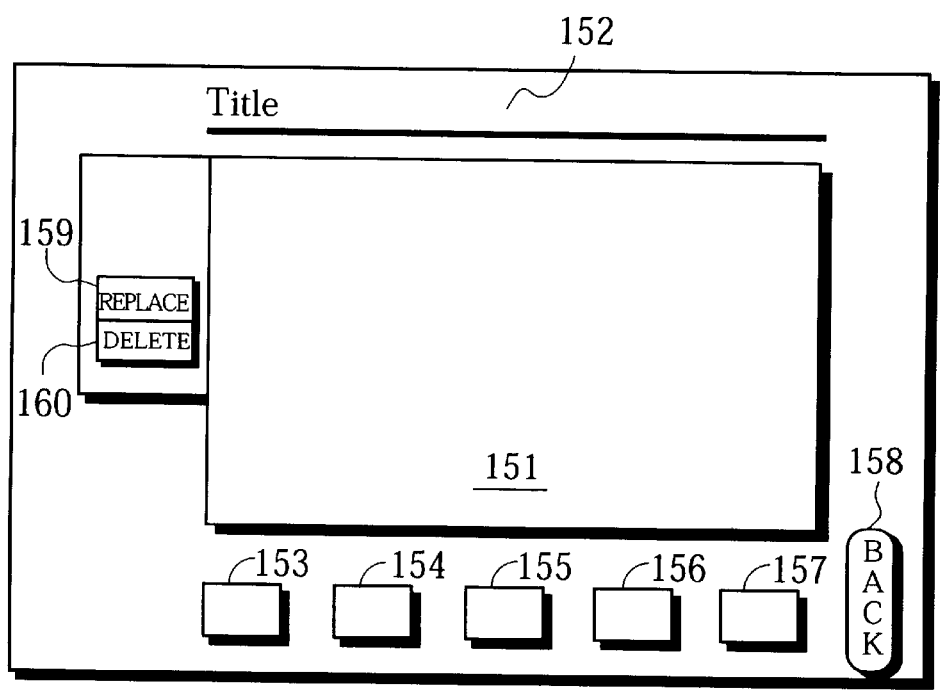
FIG. 9 is a schematic diagram showing an exemplary outside-view-image selection panel.
Figure 10:
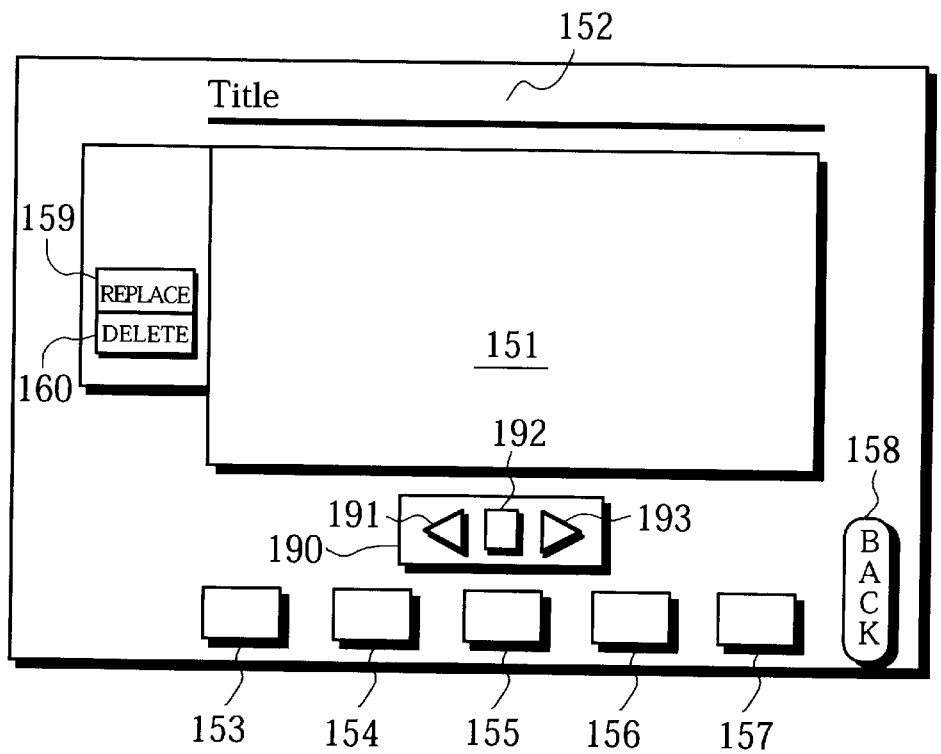
FIG. 10 is a schematic diagram showing an exemplary outside-view-image selection panel when a motion picture is selected.
Figure 12:
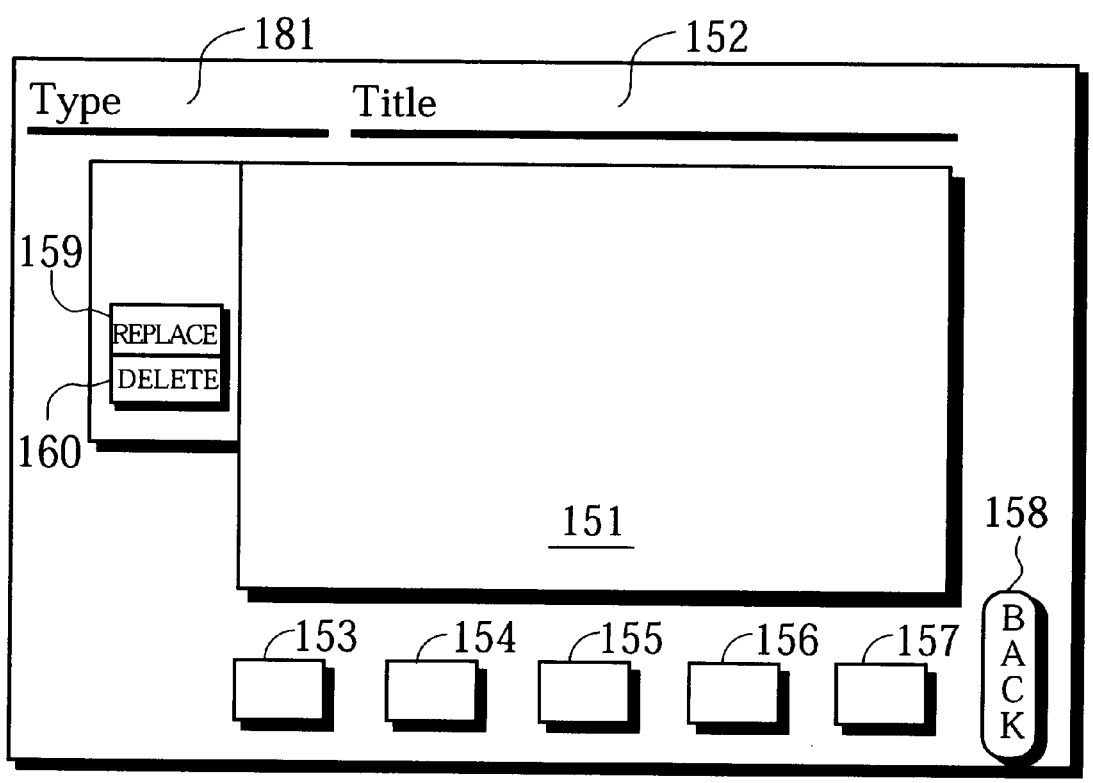
FIG. 12 is a schematic diagram showing an exemplary inside-view-image selection panel.

When the editor clicks on any one of the room-type selection buttons 161 to 169 (Step 19), an inside-view-image selection panel is displayed as shown in FIG. 12 (Step 20). The inside-view-image selection panel is similar in all respects to the outside-view-image selection panel of FIG. 9, except that a room-type entry region 181 is provided. In FIG. 12, like parts to those of FIG. 9 are represented by like reference numerals.

An inside-view-image selection processing is performed by using the inside-view-image selection panel (Step 21). Steps taken for selecting an inside-view image are the same with those taken in the procedure for selecting an outside-view image, except that the room type is entered and therefore, the description thereof is omitted. It is to be noted that, as shown in FIG. 3, the image filenames, image types and entered character strings related to the selected inside-view images are stored, as inside-view reference information, in the reference file creation area of the memory 12 on a room-type basis and in association with the respective inside-view-image selection buttons 153 to 157.

When the inside-view selection processing is completed by selecting one or more inside-view images in association with one or more room types, the editor returns the screen display to the edit menu panel by sequentially manipulating BACK buttons (Steps 22, 23). Specifically, the screen display is returned from the current inside-view-image selection panel to the edit menu panel of FIG. 4 via the room-type selection panel, front cover panel, design selection panel and the presentation-type selection panel.

When the editor clicks on SAVE button 103 in the edit menu panel thus displayed (Step 24), a presentation execution software for execution of this presentation is created (step 25). The presentation execution software is composed of a reference file containing the reference information (see FIG. 3) stored in the reference file creation area of the memory 12, a presentation execution program, the image files associated with the image filenames described in the reference file, and the template files selected by the editor. The presentation execution software is stored in the hard disk 13 as accommodated in one folder (presentation folder).

Subsequently, the editor clicks on END button 104 for terminating the presentation creation program (step 26). Incidentally, a shortcut key (e.g., [control]key +[S]key) is assigned to a save command so that the command is executed simply by entering the shortcut via the keyboard. Likewise, a shortcut key (e.g., [control]key +[Q]key) is assigned to an end command so that the command is executed simply by entering the shortcut via the keyboard.

In a case where "outside view only" is selected in the presentation-type selection panel displayed in Step 3, INSIDE-VIEW button 144 does not appear in the front cover panel (see FIG. 8) displayed in Step 10. Accordingly, Steps 16 to 21 for selecting the inside-view image are dispensed with.

In a case where "inside view only" is selected in the presentation-type selection panel displayed in Step 3, OUTSIDE-VIEW button 143 does not appear in the front cover panel (see FIG. 8) displayed in Step 10. Accordingly, Steps 12 to 16 for selecting the outside-view image are dispensed with.

[3] Procedure for Editing an Already Created Presentation Execution Software

Figure 13:
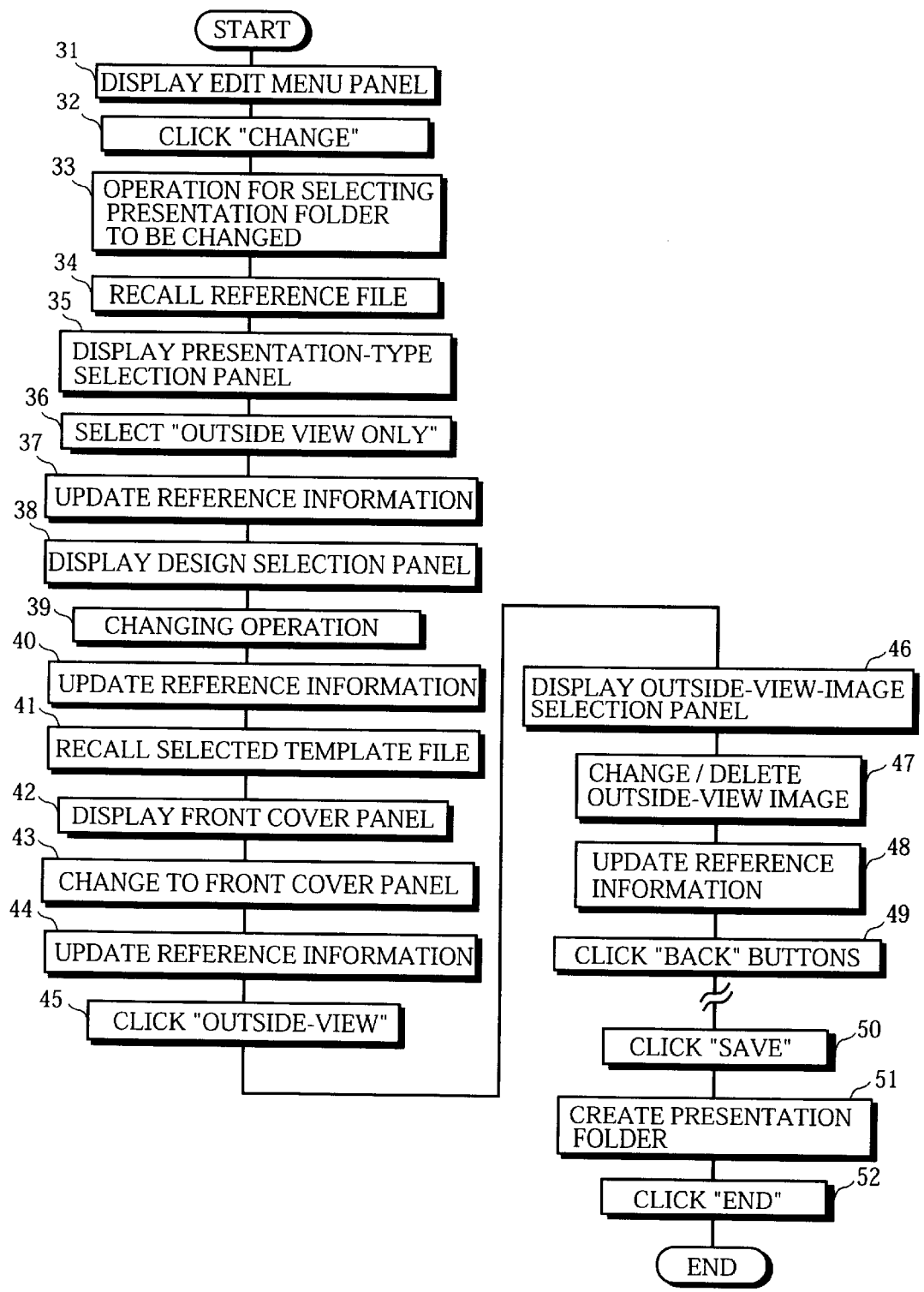
FIG. 13 is a flowchart representing steps in a procedure for editing a presentation execution software which is already created.

FIG. 13 represents steps in a procedure for editing an already created presentation execution software. Specifically, FIG. 13 illustrates the steps for changing the presentation type from "outside/inside views" to "outside view only" and changing the design, front cover and outside-view image accordingly.

By starting the presentation creation program included in the presentation creation software, the edit menu panel is caused to appear as shown in FIG. 4 (Step 31). When the editor clicks on CHANGE button 102 (Step 32), there appears a dialog permitting the editor to select a presentation execution software to be changed (presentation folder) from one or more presentation execution softwares already created. Thus, the editor follows the dialog to select the presentation folder to be changed.

When the presentation folder to be changed is selected (Step 33), a reference file contained in the presentation folder is recalled to be copied to the reference file creation area of the memory 12 (Step 34).

On the other hand, the presentation-type selection panel is displayed as shown in FIG. 5 (Step 35). At this time, a type-selection button is lit up in association with the presentation type stored in the reference file creation area. Where the presentation type stored in the reference file creation area indicates both the outside view and inside view, "outside/inside views" selection button 113 is lit up.

If the editor desires to change the presentation type or, in this instance, to change the presentation type from "outside/inside views" to "outside view only", the editor clicks on the type-selection button 111 for "outside view only".

When the editor clicks on the type-selection button 111 for "outside view only" (Step 36) the reference information regarding the presentation type, which is stored in the reference file creation area of the memory 12, is changed from "outside/inside views" to "outside view only" (Step 37). That is, the reference information is updated.

Then, the design selection panel is displayed as shown in FIG. 6 (Step 38). If the change of the presentation type is not desired when the presentation-type selection panel is displayed, the design selection panel may be caused to appear by clicking on the lit-up selection button. When the design selection panel is displayed, there appears a template image contained in the template file corresponding to the template filename stored in the reference file creation area.

If the editor desires to change the design to another, the editor may manipulate the design switch buttons 122, 124 to invoke a template image of a desired design and then click on DECISION button 123 (Step 39). When the design is changed in this manner, the template filename stored in the reference file creation area of the memory 12 is changed to a new template filename (Step 40). That is, the reference information is updated.

In a case where the editor does not desire the change of design, the editor clicks on DECISION button 123 without manipulating the design switch buttons 122, 124. In this case, the reference information is not updated.

Next, the template file selected by the editor is read in (Step 41), to be stored in the memory 12. Then, a front cover panel corresponding to the template selected by the editor is displayed as shown in FIG. 8 (Step 42).

It is noted that since the presentation type of "outside view only" is selected in the above Step 36 (the presentation type of the reference information represents "outside view only"), INSIDE-VIEW button 144 does not appear.

If necessary, the editor can change the title and front cover image in this front cover panel by taking similar steps to those taken for creating a new software (Step 43). When the title is changed, the character string for the front cover, which is stored in the reference file creation area of the memory 12, is changed. When the front cover image is changed, the filename and the image type of the front cover image, which are stored in the reference file creation area of the memory 12, are changed (Step 44).

The change of the front cover image may be accomplished by clicking on the image fitting region 141 or on IMAGE REPLACE button 146. In either way, there is caused to appear the dialog (not shown) for permitting the editor to make a choice among the image files prepared by the editor.

When the editor clicks on OUTSIDE-VIEW button 143 (Step 45), there appears an outside-view selection panel corresponding to the design selected by the editor, as shown in FIG. 9 (Step 46). At this time, an outside view and a subtitle are displayed based on the outside-view reference information (image file name, image type and character string) stored in the reference file creation area of the memory 12 in association with the first button 153. Upon each switch among the buttons 153 to 157, the outside-view image and the subtitle are displayed based on the outside-view reference information corresponding to the currently selected one of the buttons 153 to 157, which information is included in the reference information stored in the reference file creation area of the memory 12.

This outside-view-image selection panel permits the editor to delete an unwanted outside-view image or to change the subtitle or outside-view image through similar steps to those taken for creating a new software (Step 47). When the subtitle is changed, the outside-view character string, which is stored in the reference file creation area of the memory 12, is changed. When the outside-view image is changed, changed are the outside-view-image filename and the image type related to the changed outside-view image, which are stored in the reference file creation area of the memory 12 (Step 48).

The change of the outside-view image may be accomplished by clicking on the image fitting region 151 or IMAGE REPLACE button 159. In either way, there is caused to appear the dialog (not shown) for permitting the editor to make a choice among the image files prepared by the editor.

In order to delete an outside-view image selected in association with any one of the selection buttons 153 to 157, the editor may click on IMAGE DELETE button 160 or right-click anywhere in the image fitting region 151. Then, there appears a dialog "Delete?" for confirmation, to which the editor responds by selecting "YES". This effects the deletion of the outside-view image displayed in the outside-view image fitting region 151 as well as of the outside-view reference information which is stored in the reference file creation area in association with the deleted outside-view image (Step 48).

When the changing operation is completed, the editor sequentially manipulates BACK buttons (Step 49) thereby returning the screen display to the edit menu panel shown in FIG. 4. Specifically, the screen display is returned from the currently shown outside-view-image selection panel to the edit menu panel via the front cover panel, design selection panel and presentation-type selection panel.

If the editor clicks on SAVE button 103 in the edit menu panel displayed on screen (Step 50), a presentation execution software (presentation folder) is created for execution of this re-edited presentation and is stored in the hard disk 13 (Step 51). Subsequently, with a click on END button 104, the editor can terminate the presentation creation program.

Figure 11:
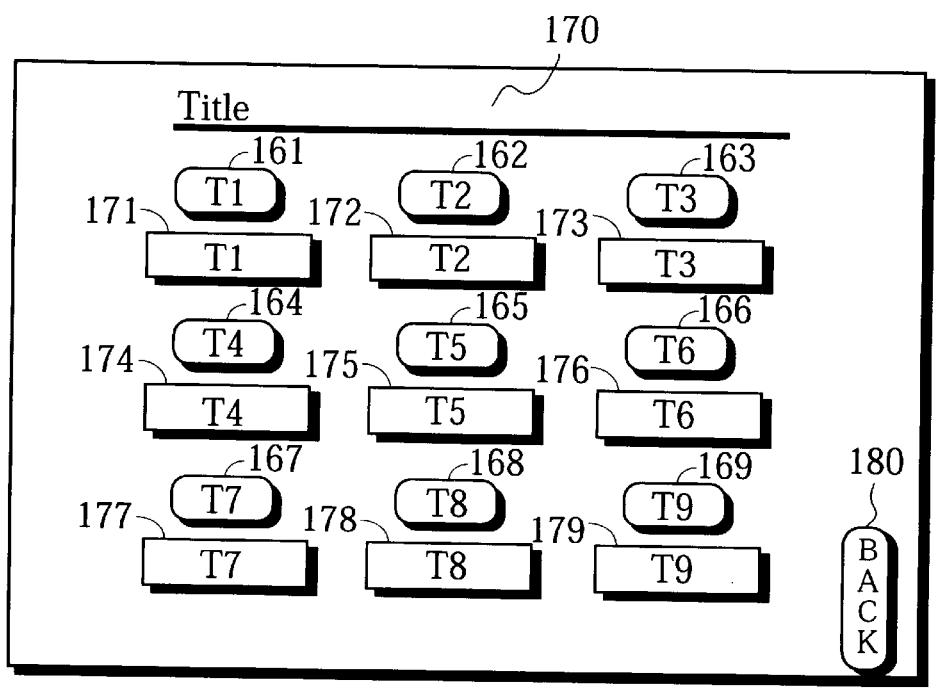
FIG. 11 is a schematic diagram showing an exemplary room-type selection panel.

In a case where "inside view only" is selected in the above Step 36, the outside-view-image selection panel does not appear but the room-type selection panel (see FIG. 11) and the inside-view-image selection panel (see FIG. 12) are displayed for permitting the changes of the room type and the inside-view image. In a case where "outside/inside views" is selected in the above Step 36, the room-type selection panel (see FIG. 11) and the inside-view-image selection panel (see FIG. 12) are displayed besides the outside-view-image selection panel, so that the changes of the outside-view image as well as the room type and the inside-view image are permitted.

Incidentally, if CHANGE button 102 in the edit menu panel is clicked in the middle of creation of the presentation execution software, similar steps to those subsequent to Step 35 shown in FIG. 13 may be taken to re-edit the in-process software based on the reference information stored in the reference file creation area of the memory 12 as of the point in time.

[4] Procedure for Executing a Presentation

Figure 14:
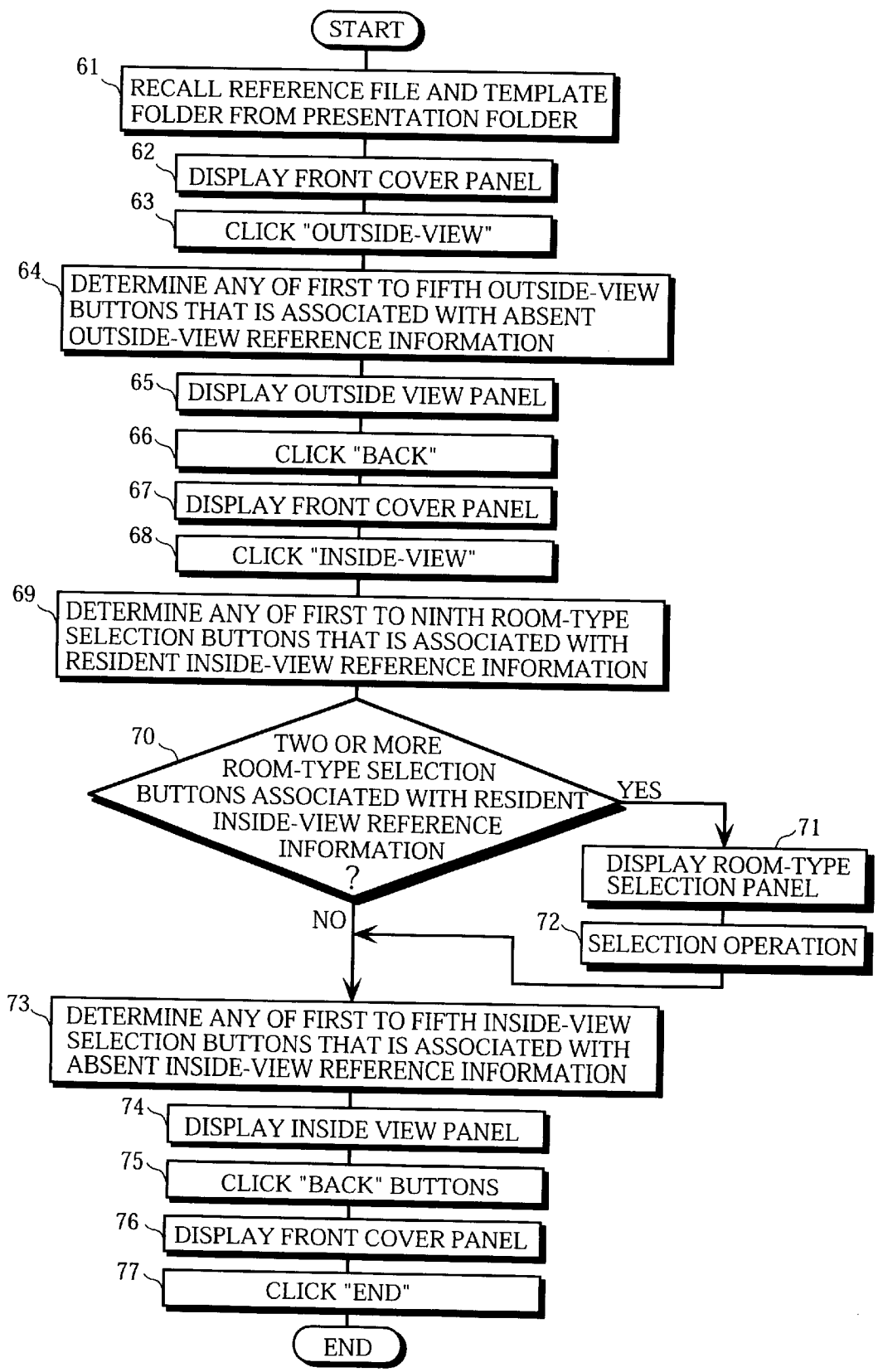
FIG. 14 is a flowchart representing steps in a procedure for executing a presentation.

FIG. 14 represents steps in the procedure for executing a presentation.

The presentation is started by activating the presentation execution program contained in the presentation folder created by the presentation creation software.

Upon activation of the presentation execution program, recalled are the reference file and the template folder from the presentation folder (Step 61).

Figure 15:
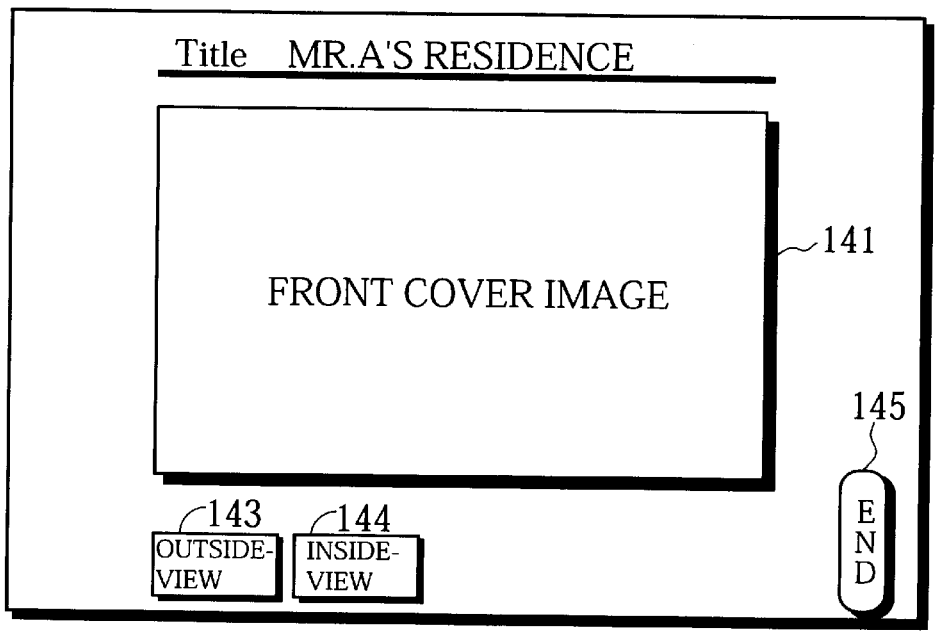
FIG. 15 is a schematic diagram showing an exemplary front cover panel.

Then, as shown in FIG. 15, a front cover panel comparable to that of FIG. 8 is displayed (Step 62). The front cover panel includes a front-cover-image display region 141, a title display region, OUTSIDE-VIEW button 143, INSIDE-VIEW button 144 and END button 145.

A front cover image constituting the front cover panel is displayed through the steps of recalling an image file corresponding to a front-cover image filename described in the reference file recalled in Step 61, and changing the size of the recalled image based on the size of the image display region 141 contained in the template folder recalled in Step 61 thereby matching the image with the image display region. On the other hand, characters constituting the title represent a front-cover character string described in the reference file and are displayed at a give position and in a given size and style according to the display position, character size and character style of the title which are contained in the template folder.

In a case where the presentation type described in the reference file indicates "outside/inside views", both OUTSIDE-VIEW button 143 and INSIDE-VIEW button 144 are displayed, as shown in FIG. 15. In a case where the presentation type described in the reference file indicates "outside view only", only OUTSIDE-VIEW button is displayed but INSIDE-VIEW button 144 does not appear. In a case where the presentation type described in the reference file indicates "inside view only", only INSIDE-VIEW button 144 is displayed but OUTSIDE-VIEW button 143 does not appear.

When the front cover panel of FIG. 15 is displayed a sentence, such as "Mr.A's residence is presented on screen", is formed by combining the title "Mr.A's Residence" with a predetermined phrase and then is outputted as speech. The whole speech may be presented through speech synthesis. Alternatively, the speech may be presented in a manner such that the predetermined phrase of the speech depends upon the reproduction of recorded human voice and only the title depends upon speech synthesis.

Further, an arrangement may be made such that a voice message is outputted according to the type of a displayed button like OUTSIDE-VIEW button 143 and INSIDE-VIEW button 144. For example, in a case where both OUTSIDE-VIEW button 143 and INSIDE-VIEW button 144 are displayed, a voice message saying "The outside view and inside view are presented on screen" may be outputted. Where only OUTSIDE-VIEW button 143 is displayed, a voice message saying "The outside view is presented on screen" may be outputted. Where only INSIDE-VIEW button is displayed, a voice message saying "The inside view is presented on screen" may be outputted.

When OUTSIDE-VIEW button 143 is clicked (Step 63) the outside-view reference information described in the reference file is checked to determine any of the first to fifth outside-view selection buttons 153 to 157 that is associated with absent outside-view information (Step 64). It is assumed here that the third button 155, the fourth button 156 and the fifth button 157 are associated with the absent outside-view reference information.

Figure 16:
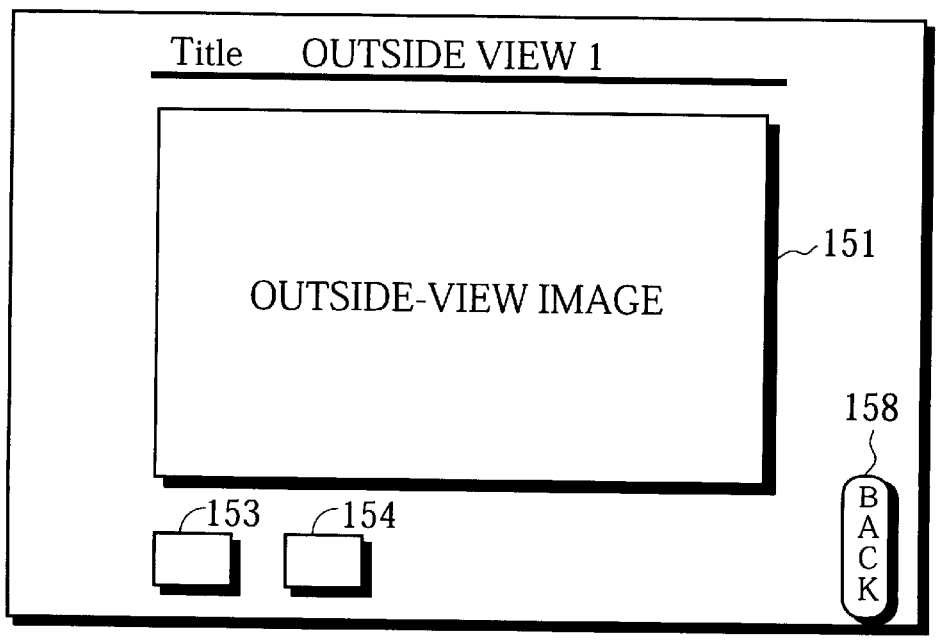
FIG. 16 is a schematic diagram showing an exemplary outside view panel.

Subsequently, there appears an outside view panel comparable to the outside-view-image selection panel (see FIG. 9), as shown in FIG. 16 (Step 65). At this time, the selection buttons determined to be associated with the absent outside-view reference information are not displayed. Inasmuch as the third to fifth buttons 155 to 157 of the outside-view-image selection panel are associated with the absent outside-view reference information, the outside view panel consists of the outside-view-image display region 151 showing the outside-view image, the subtitle display region, the first and second outside-view selection buttons 153, 154 and BACK button 158.

The outside-view image constituting the outside view panel is displayed through the steps of recalling an image file corresponding to an outside-view image filename described in the reference file in association with the first outside-view selection button 153, and changing the size of the recalled image based on the size of the image display region contained in the template folder thereby matching the image with the image display region. On the other hand, characters constituting the subtitle represent the outside-view character string described in the reference file in association with the first button and are shown at a given position and in a given size and style according to the display position, character size and character style of the subtitle which are contained in the template folder.

When the outside view panel of FIG. 16 is displayed, a sentence, such as "Outside view 1 is presented on screen", is formed by combining the title "Outside view 1" with a predetermined phrase and then is outputted as speech. The whole speech may be presented through speech synthesis Alternatively, the speech may be presented in a manner such that the predetermined phrase of the speech depends upon the reproduction of recorded human voice and only the title depends upon speech synthesis.

Otherwise, an arrangement may be made such that the voice message is outputted in accordance with the number of displayed buttons that are selected from the first to fifth outside-view selection buttons 153 to 157. For instance, with two outside-view selection buttons displayed, a voice message saying "Two outside views are presented on screen" may be outputted.

When the second button 154 in the displayed outside-view panel is clicked, the image and the subtitle constituting the outside view panel are changed based on the outside-view reference information described in the reference file in association with the second button.

With a click on BACK button 158 (Step 66), the screen display is returned to the front cover panel for presentation of the inside-view images. When INSIDE-VIEW button 144 in the displayed front cover panel is clicked (Step 67), the inside-view reference information described in the reference file is checked to determine any of the first to ninth room-type selection buttons 161 to 169 of the room-type selection panel shown in FIG. 11 that is associated with resident inside-view reference information (Step 69).

Figure 17:
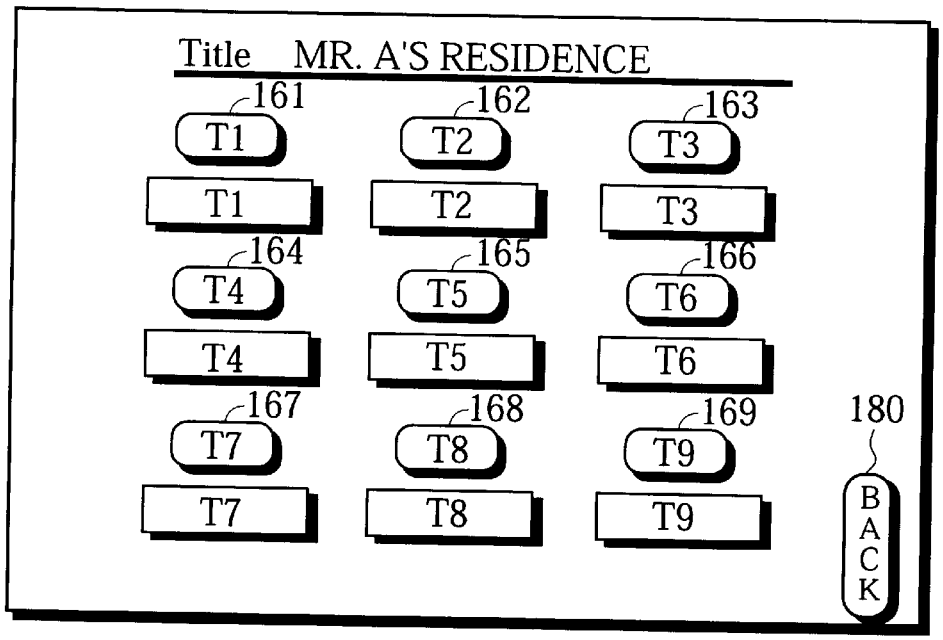
FIG. 17 is a schematic diagram showing an exemplary room-type selection panel.

Subsequently, judgment is made as to whether two or more room-type selection buttons are associated with the resident inside-view reference information or not (Step 70). If two or more room-type selection buttons are associated with the resident inside-view reference information, a room-type selection panel resemblant to that of FIG. 11 appears as shown in FIG. 17 (Step 71). In this case, out of the room-type selection buttons 161 to 169, only the buttons associated with the resident inside-view reference information are lit up.

Figure 18:
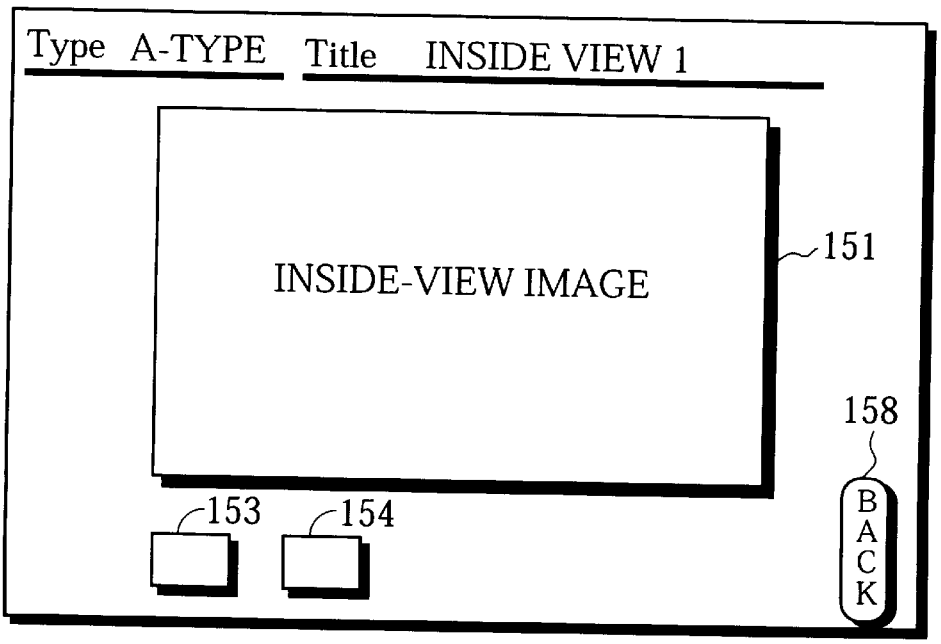
FIG. 18 is a schematic diagram showing an exemplary inside view panel.

When one of the lit-up room-type selection buttons is clicked (Step 72), the inside-view reference information associated with the selected room-type selection button is checked to determine any of the first to fifth inside-view selection buttons 153 to 157 in the inside-view-image selection panel of FIG. 12 that is associated with absent inside-view reference information (Step 73). It is assumed here that the third button 155, the fourth button 156 and the fifth button 157 are associated with the absent inside-view reference information. Subsequently, as shown in FIG. 18, an inside view panel comparable to the inside-view-image selection panel (see FIG. 12) is displayed based on the inside-view reference information associated with the selected room-type selection button (Step 74).

If it is determined in the above Step 70 that one room-type selection button is associated with the resident inside-view reference information, the room-type selection panel does not appear. In this case, the resident inside-view reference information associated with the single room-type selection button is checked to determine any of the first to fifth inside-view selection buttons 153 to 157 that is associated with the absent inside-view reference information (Step 73). It is assumed here that the third button 155, the fourth button 156 and the fifth button 157 are associated with the absent inside-view reference information. Subsequently, as shown in FIG. 18, the inside view panel comparable to the inside-view-image selection panel (see FIG. 12) is displayed based on the resident inside-view reference information associated with the single room-type selection button (Step 74).

When the inside view panel is displayed, the inside-view selection button determined to be associated with the absent inside-view reference information does not appear. Inasmuch as no inside-view reference information is associated with the third to fifth buttons 155 to 157 of the inside-view-image selection panel, the inside view panel, as shown in FIG. 18, consists of the inside-view-image display region 151 showing the inside-view image, the room-type display region, the subtitle display region, the first and second inside-view selection buttons 153, 154 and BACK button 158.

The inside-view image constituting the inside view panel is displayed through the steps of recalling an image file related to a inside-view image filename corresponding to the first inside-view selection button from the inside-view reference information associated with the currently selected room type, and changing the size of the recalled image based on a size of the image display region contained in the template folder thereby matching the image with the image display region. On the other hand, characters constituting the room type and the subtitle represent the inside-view character string described in the reference file in association with the first button, and are shown at a give position and in a given size and style according to the display position, character size and character style of the room type and subtitle which are contained in the template folder.

When the inside view panel is displayed as shown in FIG. 18, a sentence, such as "Type A inside view is presented on screen", is formed by combining the type name "A" and the title "Inside view 1" with a predetermined phrase and then is outputted as speech. The whole speech may be presented through speech synthesis. Alternatively, the speech may be presented in a manner such that the predetermined phrase of the speech depends upon the reproduction of recorded human voice and only the title and the like depend upon speech synthesis.

Otherwise, an arrangement may be made such that a voice message is outputted in accordance with the number of displayed buttons that are selected from the first to fifth inside-view selection buttons 153 to 157. For instance, with two inside-view selection buttons displayed, a voice message saying "Two inside views are presented on screen" may be outputted.

With a click on the second button 154 in the displayed inside view panel, the image constituting the inside view panel as well as the subtitle are changed based on the inside-view reference information related to the second button, which inside-view reference information corresponds to the currently selected room type.

Subsequently, by sequentially manipulating BACK buttons, the display screen is returned to the front cover panel shown in FIG. 15 (Steps 75, 76). When the editor clicks on END button 145 in the front cover panel thus shown (Steps 75, 77), the presentation execution program is terminated.

According to the above embodiment, the attribute information regarding the position and size of the image fitting region is assigned to each template file. Therefore, even if the template file is changed after the image is fitted in place, the pre-change image can be displayed at place corresponding to the image fitting region of a replacing template and in a size defined by the image fitting region.

According to the above embodiment, the attribute information regarding the position of the character display region, the character size and the character style is assigned to each template file. Therefore, even if the template file is changed after the characters are entered, the character string displayed in the pre-change character display region can be displayed at a character display region of a replacing template and in a character size and style defined by the replacing template.

According to the above embodiment, the presentation editing software is so configured as to have all the facilities (such as, for example, outside-view selection button, inside-view selection button and the like) displayed on screen during the execution of a presentation, as a part of the facilities included in the panel which is shown during the editing of the presentation. This leads to a merit of giving, in the middle of editing the presentation, a foreknowledge about what the created presentation execution software is like.

According to the above embodiment, when the front cover panel, the outside-view-image selection panel or the inside-view-image selection panel is displayed, the editor may click on the image fitting region thereby to invoke the dialog for permitting the editor to select an image to be fitted in the image fitting region. Then, the image selected by the editor following this dialog is displayed in the image fitting region and hence, the selection of the image to be displayed in the image fitting region is facilitated.

According to the above embodiment, when the front cover panel, the outside-view-image selection panel or the inside-view-image selection panel is displayed with the image fitting region showing the image selected by the editor, the editor may click on the image fitting region thereby to invoke the dialog for permitting the editor to select an image to be displayed in the image fitting region. Then, the currently shown image is replaced with the image selected by the editor following this dialog and hence, the image replacement is facilitated.

According to the above embodiment, when the front cover panel, the outside-view-image selection panel or the inside-view-image panel is displayed, the editor may click on the character display region thereby to place the PC in the character entry mode for permitting the entry of a character string to be shown in the character display region. The character string entered in the character entry mode is caused to appear in the character display region, resulting in easy entry of characters in the character display region.

According to the above embodiment, when the front cover panel, the outside-view-image selection panel or the inside-view-image selection panel is displayed with the character display region showing the character string entered by the editor, the editor may click on the character display region thereby to place the PC in the character entry mode for permitting the change of the character string shown in the character display region. The character string entered in the character entry mode is caused to appear in the character display region and hence, the character string entered in the character display region is readily changed.

According to the above embodiment, the reference file is created which contains the description of the reference information which includes the link information (image filename) designating each image file holding an editor-designated fitting image, and the character string entered by the editor, whereas the presentation execution software (presentation folder) is created which includes the presentation execution program, the template file containing the templates, the reference file, and the image file designated by the link information described in the reference file.

This offers merits that the creation of plural types of presentation execution softwares does not require the change of the presentation execution program itself and that the presentation folder may be copied into another PC for permitting the another PC to execute the presentation.

The invention negates the need for storing, in the presentation folder, the image file designated by the link information described in the reference file. In this case, too, there is a merit that the creation of plural types of presentation execution softwares does not require the change of the presentation execution program.

In the execution of the presentation, a phrase predetermined for each panel to be presented is combined with the character string to be displayed in the character display region of the presented panel whereby a sentence is formed to be outputted as speech. Thus is implemented the presentation accompanied by speech.

What is claimed is:

1. A panel creation method for creating a given panel through the steps of permitting a user to select a given template file from a plurality of template files each containing a template with an image fitting region, and causing a template of the selected template file to appear while fitting a user-designated image in the image fitting region of the displayed template, the panel creation method wherein attribute information regarding a position and a size of the image fitting region is assigned to each template file, and when the user designates an image to be fitted in the image fitting region subsequent to the display of the template of the user-selected template file, said attribute information contained in the user-selected template file is referred to for causing the user-designated image to appear at place corresponding to the image fitting region of the template and in a size defined by the image fitting region of the template.

2. A panel creation method as claimed in claim 1, wherein when the template file is changed after the image is fitted in, a template of a post-change template file is displayed instead of the template of the pre-change template file whereas said attribute information contained in the post-change template file is referred to for causing the pre-change image to appear at place corresponding to an image fitting region of the post-change template and in a size defined by the image fitting region.

3. A panel creation method as claimed in claim 1, wherein both a still picture and a motion picture are designatable as the image to be fitted in the image fitting region, and wherein if the selected motion picture is of a stream motion image, the stream motion image is reproducibly displayed in the image fitting region and if the selected motion picture is of an interactive motion image adapted for an interactive operation, the interactive motion image is displayed in the image fitting region in an interactively operable manner.

4. A panel creation method as claimed in claim 1, wherein the user clicks on the image fitting region of the displayed template thereby invoking a dialog for permitting the user to select an image to be fitted in the image fitting region.

5. A computer-readable record medium recording a panel creation program for creating a given panel through the steps of permitting a user to select a given template file from a plurality of template files each having a template with an image fitting region, and causing a template of the selected template file to appear while fitting a user-designated image in the image fitting region of the displayed template, the computer-readable record medium which holds, for each template-file, attribute information regarding a position and a size of the image fitting region, and which records the panel creation program for implementing a facility which, when the user designates an image to be fitted in the image fitting region subsequent to the display of the template of the user-selected template file, serves to cause the user-designated image to appear at place corresponding to the image fitting region of the template and in a size defined by the image fitting region by referring to said attribute information contained in the user-selected template file.

6. A computer-readable record medium recording the panel creation program as claimed in claim 5, which stores a program for implementing a facility to permit the user to click on the image fitting region of the displayed template for invoking a dialog for permitting the user to select an image to be fitted in the image fitting region.

7. A panel creation device comprising:

a storage unit for storing plural types of template files each containing a template with an image fitting region and attribute information regarding a position and a size of the image fitting region;

first means for permitting a user to select a given template file from said plural types of template files;

second means for causing a display unit to display a template of the template file selected by the user; and third means which refers to said attribute information contained in the template file selected by the user, for causing a user-designated image to appear at place corresponding to the image fitting region of the template displayed by the second means and in a size defined by the image fitting region.

8. A panel creation device as claimed in claim 7, further comprising means for permitting the user to click on the image fitting region of the displayed template for invoking a dialog for permitting the user to select an image to be displayed in the image fitting region.

9. A panel creation method for creating a given panel through the steps of permitting a user to select a given template file from a plurality of template files each containing a template with a character display region, and causing a template of the selected template file to appear while causing a user-entered character string to appear in the character display region of the displayed template, the panel creation method wherein attribute information regarding a position of the character display region, a character size and a character style is assigned to each template file, and when the user enters a character string subsequent to the display of the template of the user-selected template file, said attribute information contained in the user-selected template file is referred to for causing the user-entered character string to appear in the character display region of the template and in the character size and the character style of said attribute information.

10. A panel creation method as claimed in claim 9, wherein when the template file is changed subsequent to the character entry, a template of a replacing template file is displayed in stead of the pre-change template whereas said attribute information contained in the replacing template file is referred to for causing the pre-change character string to be shown in a character display region of the replacing template and in a character size and a character style defined by the replacing template.

11. A computer-readable record medium recording a panel creation program for creating a given panel through the steps of permitting a user to select a given template file from a plurality of template files each containing a template with a character display region, and causing a template of the selected template file to appear while causing a user-entered character string to appear in a character display region of the displayed template, the computer-readable record medium which holds, for each template file, attribute information regarding a position of the character display region, a character size and a character style, and which records the panel creation program for implementing a facility which, when the user enters a character string subsequent to the display of a template of the user-selected template file, serves to cause the user-entered character string to appear in the character display region of the template and in a character size and a character style of said attribute information by referring to said attribute information contained in the user-selected template file.

12. A panel creation device comprising:

a storage unit for storing plural types of template files each containing a template with a character display region and attribute information regarding a position of the character display region, a character size and a character style;

first means for permitting a user to select a given template file from said plural types of template files;

second means for causing a display unit to display a template of the user-selected template file; and third means which refers to said attribute information contained in the user-selected template file for causing a user-entered character string to appear at a character display position of the template displayed by the second means and in a character size and a character style of said attribute information.

13. A panel presentation method for providing presentation of plural edit panels by using a template with a character display region for showing an editor-entered character string, and the editor-entered character string to be displayed in the character display region, the panel presentation method wherein, in the edit panel presentation, a phrase predetermined for the presented panel is combined with the character string shown in the character display region of the presented panel for forming a sentence and the resultant sentence is outputted as speech.

14. A computer-readable record medium recording a panel presentation program for providing presentation of plural edit panels by using a template with a character display region for showing an editor-entered character string, and the editor-entered character string to be displayed in the character display region, the computer-readable record medium which records the panel presentation program for implementing a facility to form a sentence, in the edit panel presentation, by combining a phrase predetermined for the presented panel with the character string shown in the character display region of the presented panel and a facility to output the resultant sentence as speech.

15. A panel presentation device for providing presentation of plural edit panels by using a template with a character display region for showing an editor-entered character string, and the editor-entered character string to be displayed in the character display region, the panel presentation device comprising means for forming a sentence, in the edit panel presentation, by combining a phrase predetermined for the presented panel with the character string shown in the character display region of the presented panel, and means for outputting the resultant sentence as speech.

* * * * *